March 3, 1942.  F. M. LANKFORD  2,274,927
SLEEVE TYPE PISTON ROD
Filed Nov. 4, 1940  2 Sheets-Sheet 1
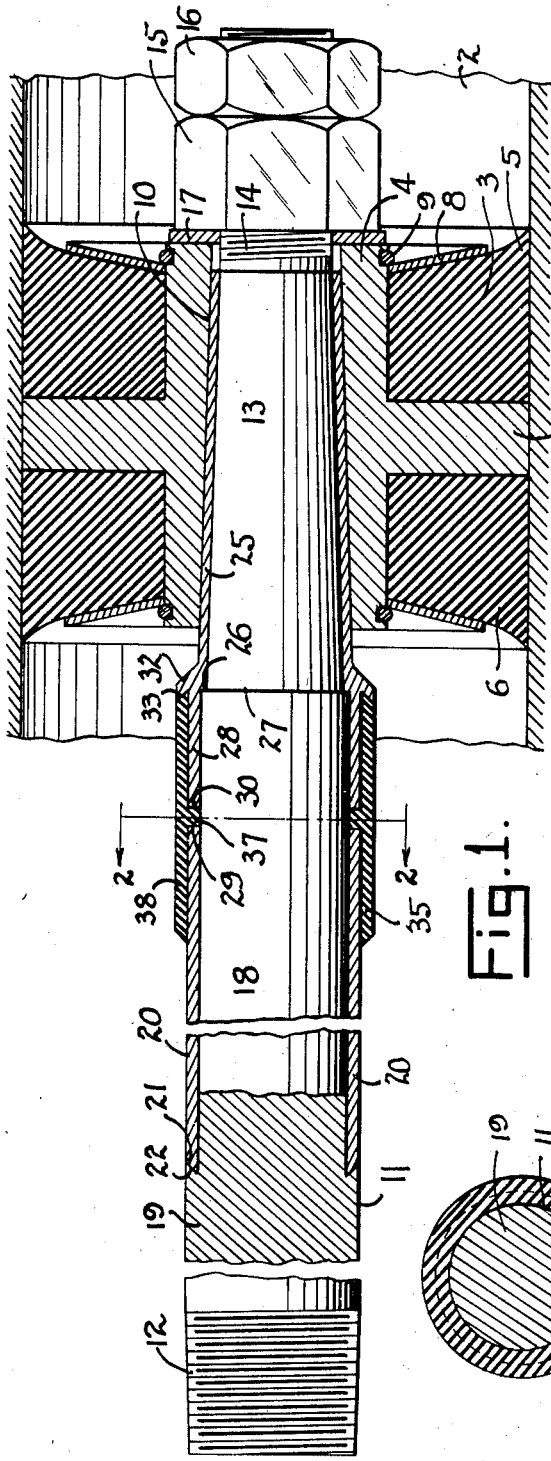
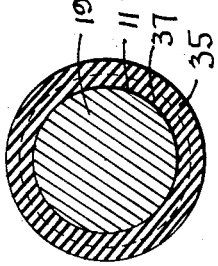
F. M. LANKFORD
INVENTOR.
BY Lester B. Clark.
ATTORNEY March 3, 1942.  F. M. LANKFORD  2,274,927
SLEEVE TYPE PISTON ROD
Filed Nov. 4, 1940  2 Sheets-Sheet 2

F. M. LANKFORD
INVENTOR.

BY  Lester B. Clark.

ATTORNEY.

Patented Mar. 3, 1942

2,274,927

UNITED STATES PATENT OFFICE 2,274,927

SLEEVE TYPE PISTON ROD

Francis M. Lankford, Houston, Tex.

Application November 4, 1940, Serial No. 364,189

16 Claims. (Cl. 309—4)

The invention relates to a protective sleeve for piston rods of the type used in slush pumps for circulating mud into and out of the well bore in the rotary method of drilling.

In pumps of the type indicated an abrasive slush composed of muds or liquids and solids is circulated into and out of the well bore and the piston rod which operates the reciprocating piston in the cylinder is subjected to very severe wear at the stuffing box where it passes through the end of the cylinder.

The present invention contemplates a sleeve of hard material which will be wear-resistant and which may be readily replaceable so that the rod will not receive any wear and may be used indefinitely merely by providing new sleeves.

It is one of the objects of the invention to provide a removable sleeve for slush pump piston rods which will prevent leakage around the sleeve where it is subjected to pressure inside the pump cylinder on the compression stroke.

Another object of the invention is to provide a combination replaceable sleeve and seal member therefor to be applied to slush pump piston rods.

Another object of the invention is to provide a pair of sleeve members to be applied to slush pump piston rods which can be sealed in position on the rod.

Still another object of the invention is to provide a pair of spaced sleeves for slush pump piston rods wherein a packing is provided to maintain a seal between the ends of the sleeves.

Another object of the invention is to provide a full-floating protective sleeve for slush pump piston rods.

Another object of the invention is to provide a protective sleeve to form a seal with a piston rod in combination with a sleeve type piston.

Another object of the invention is to provide a pair of sleeves for slush pump piston rods wherein a packing overlies the ends of the sleeves and is subjected to the pressure of liquid being pumped in order to maintain a seal to prevent leakage.

Another object of the invention is to provide a sleeve for slush pump piston rods wherein a packing overlies the sleeve and cooperates with the piston in providing a seal.

Other and further objects of the invention will be readily apparent when the following description is considered in connection with the accompanying drawings wherein:

Fig. 1 is a vertical sectional view of an arrangement of the invention as applied to a slush pump piston and rod assembly.

Fig. 2 is a section taken on the line 2—2 of Fig. 1.

Fig. 3 is a slightly modified form of the invention wherein the sleeve at the piston end is made integral with the hub of the piston.

Figure 5:
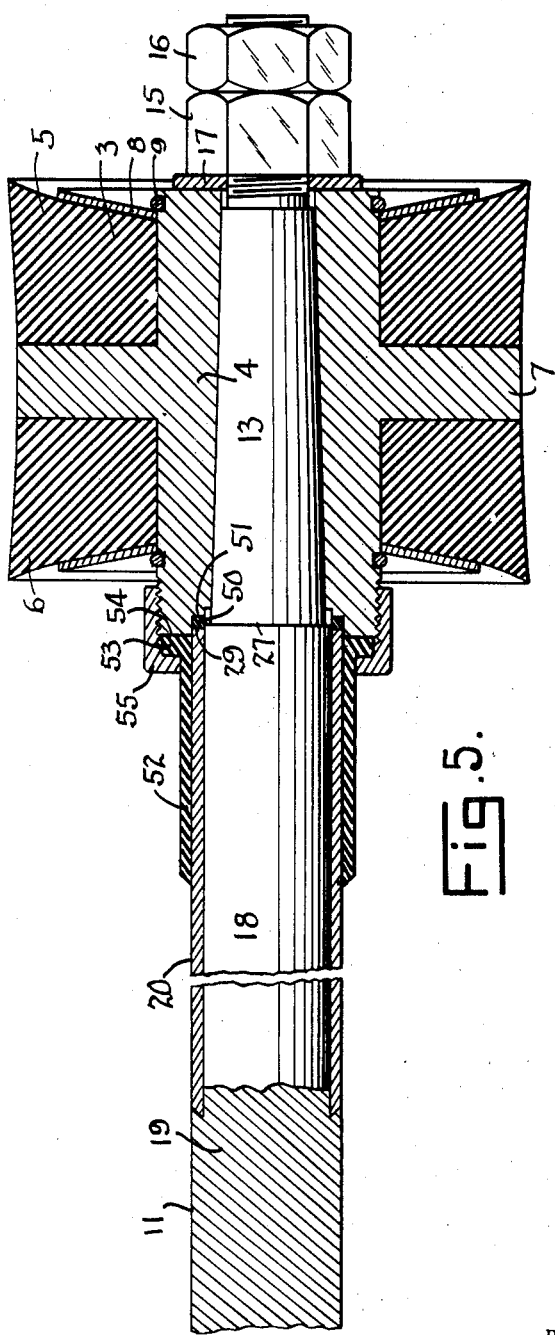
Fig. 5 is a section illustrating another form of the invention where a single sleeve is provided with an overlying packing to cooperate with the piston.

In Fig. 1 the cylinder of the pump is indicated generally at 2 and is arranged to have the piston 3 reciprocated therein. The piston is made up of a hub portion 4 having the sealing rings 5 and 6 mounted thereon to abut the flange 7. These rings may be held in position in any desired manner so that they are removable.

The present construction embodies a plate 8 and a ring 9 to maintain the plate in position on the hub and against the packing rings. This hub has a central tapered opening 10 therethrough which is arranged to receive the piston rod 11. This rod is usually some four or five feet in length. One end is threaded at 12 to be received in the power end of the pump. The end 13 of the rod is arranged to carry the piston 3 and is here shown as being tapered, with a threaded portion 14 to receive the lock nuts 15 and 16. The piston rod has a reduced area at 18 which joins the tapered portion 13 with the main body portion 19 of the rod.

The body portion 19 of the rod passes through the stuffing box of the pump so as to prevent leakage along the rod as the piston is reciprocated. In the oil fields, if leakage begins to occur around the rod, one of the drilling crew usually uses a large wrench or tong to tighten up the stuffing box. In many instances the stuffing box will be so tight about the rod that it will force abrasive materials which have worked into the packing against the face of the rod and cause it to wear materially in a very short period of time. Difficulty has been encountered in providing rods with a surface which will resist this type of abrasion. Surfaces of the rods have been hardened; in some instances they have been chromium plated, and other expedients have been resorted to. In some instances, also, replaceable sleeves have been provided but difficulty has been encountered with the sleeves heretofore used in that leakage occurred between the sleeve and the rod and through the body of the piston.

Where pressures varying from 1000 to 1500 pounds per square inch are maintained in the pump a very slight leaking of the abrasive liquid will almost instantly wear away a large opening. Instances have occurred where the entire body of the piston would be cut away by the abrasive material within a few strokes after a leak was once initiated.

In order to provide a surface which will resist this abrasion at the stuffing box so as to protect the piston 11, the present invention contemplates that a sleeve such as 20 may be provided on the reduced area 18 of the rod. This sleeve has a beveled end 21 to cooperate with the undercut shoulder 22 on the body of the rod. This sleeve 20 will be of a suitable wear-resistant material and will be of a length such that it will extend through the stuffing box and up to a point adjacent merging of the tapered portion 13 and the reduced portion 18. This sleeve need not necessarily fit tightly upon the reduced area 18, but it is intended that it can be slipped on and off at will.

A second sleeve 25 is shown as having been fitted over the tapered portion 13 of the rod and is of an outside diameter to receive the piston 3 by having the opening 10 fitted on the sleeve. This sleeve 25 has a shoulder 26 arranged to abut a complementary shoulder 27 which merges the taper 13 with the reduced area 18. An end 28 on the sleeve then projects along the area 18 to a point closely adjacent the end 29 of the sleeve 20. Thus the end 30 of this sleeve will be spaced from the end 29 of the cylindrical sleeve 20. This construction is best seen in Fig. 1. A flange 32 is provided on this tapered sleeve 25 so as to form an undercut shoulder 33 which projects outwardly beyond the periphery of the sleeve.

A resilient packing ring or member 35 is shown as having been positioned over the two adjacent ends of the sleeves 20 and 25. This packing is of a particular construction in that it has an annular ridge or rib 37 on its inner periphery intermediate the ends. This rib is arranged to fit in between the ends 29 and 30 so as to fill the space and the body of the ring is arranged to overlie the ends of the sleeves 20 and 25 for a considerable distance with one end abutting the undercut shoulder 33 and the flange 32.

Attention is directed to the fact that the entire outer surface 38 of this sleeve is subjected to the pressure in the cylinder on the compression stroke. It is on the compression stroke that leakage will occur. The compression of the liquid in the cylinder will be against this exposed surface 38 of the packing sleeve so as to force it firmly into engagement with the outer surfaces of the ends of the sleeves 20 and 25 and to maintain a seal therewith. Inasmuch as the pressure is uniform throughout the liquid in the cylinder, it seems obvious that the greater area of the inside of the packing sleeve 35 in contact with the periphery of the sleeve will prevent leakage axially of the packing along the sleeve.

This pressure on the outside of the packing will also force the rib 37 against the periphery of the reduced area 18 of the rod, and in this manner prevent leakage between the sleeve and the rod.

In assembling the device the sleeve 20 will be first positioned, then the packing ring 35 and then the sleeve 25, or the three parts may be assembled together and slipped on to the piston rod as a unit. The piston 3 is next assembled and forced over the tapered sleeve 25 by tightening of the nuts 15 and 16. A washer 17 may be positioned between the piston and the nut 15.

In operation the reciprocation of the rod 11 will cause the sleeve 20 to reciprocate back and forth through the stuffing box, but this sleeve 20 is full floating on the rod because it is spaced from the end 30 of the adjacent sleeve 25 and the resilient material of the rib 37 of the packing is positioned between the ends. Thus the tighter the stuffing box about the rod the greater will be the tendency of the sleeve 20 to slide against the rib 37 and form a seal to prevent leakage.

The sleeves and the packing are readily replaceable so as to utilize the body of the rod 11 for an indefinite period.

Fig. 3 shows a form of the invention which is very similar to that of Fig. 1 except that the sleeve 25 has been made integral with the hub 4 of the piston in that the end 28 of the sleeve 25 is now provided in the form of a skirt 40 which is part of the hub 4 of the piston. The tapered area 10 of the piston fits on the tapered area 13 of the rod and the shoulder 41 will normally be spaced somewhat from the shoulder 27 on the rod so as to permit a tight fit of the piston on the tapered portion 13 of the rod. The sleeve 20 and the packing 35 are the same in this form as discussed in connection with Fig. 1.

Figure 4:
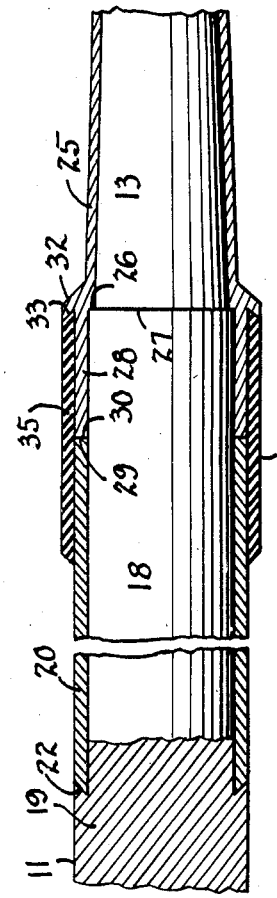
Fig. 4 is a view of the assembly somewhat similar to that of Fig. 1 except that the two sleeves are arranged in abutting relationship.

Fig. 4 shows another form of the invention wherein the parts are the same as described in connection with Fig. 1 except that the rib 37 on the packing sleeve has been omitted and the end 29 of the sleeve 20 and the end 30 of the sleeve 25 are shown as abutting each other with the packing 35 overlying the joint.

Fig. 5 shows a form wherein the sleeve 20 is the same as previously described except that it is of a length such that the end 29 is positioned closely adjacent the shoulder 27 on the rod. The piston hub 4 is fitted directly on the tapered area 13 as shown in Fig. 3. The sleeve 25 of Fig. 1 has been dispensed with and the seal ring 50 has been positioned in the recess 51 in the end of the hub 4 so that the floating movement of the sleeve 20 will be retained.

To prevent leakage between the sleeve 20 and the piston 3 a packing 52 has been positioned over the periphery of the sleeve 20. This packing serves the same purpose as the packing 35 of Fig. 1. It is somewhat different in that it has a head 53 thereon arranged to abut the end 54 of the piston body 4 and is retained in position by a cap ring 55 threaded on to the core 4. Thus after the piston 3 has been positioned and firmly fitted by tightening the nuts 15 and 16, then this cap can be screwed in place to confine the packing 52, or if it is desired the entire assembly of the sleeve 20, packing 22, cap 55 and the piston 3 can be assembled and slipped over the end of the piston because the packing ring 50 will provide for variations in the size of the parts and allow proper assemblage.

Broadly the invention contemplates a replaceable protective sleeve for piston rods which will float upon the rod wherein a leakage will be prevented.

What is claimed is:

1. A slush pump rod and piston assembly including a rod, a tapered end on said rod, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod.

2. A slush pump rod and piston assembly including a rod, a tapered end thereon, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod and a pair of sleeve portions projecting beneath the ends of said packing.

3. A slush pump rod and piston assembly including a rod, a tapered end thereon, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod and a pair of sleeve portions projecting beneath the ends of said packing but having the packing contacting the rod surface between the sleeve.

4. A slush pump rod and piston assembly including a rod, a tapered end thereon, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod and a pair of sleeve portions projecting beneath the ends of said packing, said sleeves being fitted on said rod.

5. A slush pump rod and piston assembly including a rod, a tapered end thereon, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod and a pair of sleeve portions projecting beneath the ends of said packing, one of said sleeves being on said rod and the other formed as a part of said piston.

6. A slush pump rod and piston assembly including a rod, a tapered end thereon, a piston fitted on said rod, means to clamp the piston in said fitted position, and additional means to form a seal between the rod and piston to prevent leakage along the rod comprising a resilient packing about the rod which is exposed to the pressure being pumped to form a seal with the rod and a pair of sleeve portions projecting beneath the ends of said packing, said sleeves abutting end to end.

7. A resilient packing for slush pump piston rods comprising a cylindrical body of resilient material, and an annular rib portion projecting inwardly therefrom intermediate the ends of the body.

8. A resilient packing for slush pump piston rods comprising a cylindrical body of resilient material, and an annular rib portion projecting inwardly therefrom intermediate the ends of the body, the ends of said body being beveled.

9. The combination of a slush pump piston rod having a reduced portion, a tapered end therebeyond, a sleeve of hard metal slidably mounted on said reduced portion, a second sleeve on said tapered portion and extending onto said reduced portion, a flange on said last sleeve projecting outwardly therefrom, a packing body overlying the ends of said sleeves, a rib inside of said body and disposed between the ends of said sleeves, the periphery of said body being exposed to the liquid being pumped so as to hold said body in sealing position on said sleeves.

10. The combination of a slush pump piston rod having a reduced portion, a tapered end therebeyond, a sleeve of hard metal slidably mounted on said reduced portion, a second sleeve on said tapered portion and extending onto said reduced portion, a flange on said last sleeve projecting outwardly therefrom, a packing body overlying the ends of said sleeves, a rib inside of said body and disposed between the ends of said sleeves, the periphery of said body being exposed to the liquid being pumped so as to hold said body in sealing position on said sleeves, and said rib in seating position between the sleeves and abutting said rod.

11. A pump piston and rod assembly including a rod, a piston thereon, a replaceable sleeve on said rod, a resilient packing overlying a portion of said sleeve and abutting said piston, and means to clamp said packing to said piston, said resilient packing being adapted to be subjected to pressure of fluid being pumped to form a seal with the rod.

12. A slush pump piston and rod assembly including a rod, a piston thereon, a replaceable sleeve on said rod, a resilient packing overlying a portion of said sleeve and abutting said piston, means to clamp said packing to said piston, and a seal ring disposed between the end of said sleeve and said piston.

13. The combination comprising, a pump rod for slush pumps, a metal sleeve slidably fitted over such rod, means to secure said sleeve to said rod, and a yieldable packing sealing the annulus between said rod and said sleeve.

14. The combination comprising, a pump rod for slush pumps, a metal sleeve fitted over said rod, a piston on the rod, means to maintain relative axial relation of the sleeve and rod when in operative position, and a resilient packing in engagement with each said rod, said piston, and said sleeve whereby movement of fluid therebetween is prevented.

15. A pump rod and piston assembly including a rod, a piston fitted on one end thereof, means to clamp the piston in said fitted position, a pair of sleeves surrounding said rod and in end to end abutment, and a resilient packing surrounding the abutting ends of said sleeves and exposed to the pressure of fluid being pumped to form a seal with the sleeves.

16. A pump rod and piston assembly including a rod having a body portion and a reduced portion forming a shoulder therebetween, a sleeve surrounding the rod and in engagement with said shoulder, a piston on said rod, said piston including a skirt portion extending outwardly therefrom and in end to end abutment with said sleeve, and a resilient packing surrounding the abutting ends of the sleeve and skirt portion and exposed to the pressure of fluid being pumped to form a seal with said sleeve and the skirt portion.

FRANCIS M. LANKFORD.